United States Patent [19]

Sellers

[11] Patent Number: 5,587,875
[45] Date of Patent: Dec. 24, 1996

[54] COLLAPSIBLE NOTEBOOK COMPUTER KEYBOARD STRUCTURE WITH HORIZONTALLY AND DOWNWARDLY SHIFTABLE KEY RETURN DOMES

[75] Inventor: Charles A. Sellers, Houston, Tex.

[73] Assignee: Compaq Computer Corporation, Houston, Tex.

[21] Appl. No.: 515,987

[22] Filed: Aug. 16, 1995

Related U.S. Application Data

[63] Continuation-in-part of Ser. No. 268,818, Jun. 30, 1994, Pat. No. 5,532,904.
[51] Int. Cl.⁶ .............................. G06F 1/16; H01H 3/12; B41J 11/56; H05K 7/04
[52] U.S. Cl. .......................... 361/680; 200/344; 400/490; 400/682
[58] Field of Search ................ 364/708.1; 400/490–492, 400/682, 479, 488; 341/22; 235/1 D, 145 R, 146; 200/5 A, 344, 345; 361/680

[56] References Cited

U.S. PATENT DOCUMENTS 5,268,545  12/1993  Bruner .................................. 200/345
5,463,195  7/1994  Watanabe et al. ........................ 200/344
5,466,901  11/1995  Mochizuki .............................. 200/5 A

*Primary Examiner*—Michael W. Phillips
*Attorney, Agent, or Firm*—Konneker & Smith

[57] ABSTRACT

A notebook computer is provided with a collapsible keyboard structure in which, in response to closing of the computer housing lid, the key return spring portions of the keyboard are shifted horizontally and downwardly away from their normal underlying relationships with the keys and the keys are forcibly retracted downwardly to a storage/transport orientation in which the overall vertical thickness of the keyboard structure is reduced by an amount somewhat greater than the stroke distance of the keys. When the lid is subsequently opened, the key return spring portions are upwardly shifted back to their normal underlying relationships with the keys, and the keys are forced upwardly by the return spring portions to their extended, operative orientations above the return spring portions.

20 Claims, 4 Drawing Sheets

COLLAPSIBLE NOTEBOOK COMPUTER KEYBOARD STRUCTURE WITH HORIZONTALLY AND DOWNWARDLY SHIFTABLE KEY RETURN DOMES

CROSS REFERENCE TO RELATED APPLICATION

This application is a continuation-in-part of U.S. application Ser. No. 08/268,818 filed on Jun. 30, 1994 now U.S. Pat. No. 5,532,904 and entitled "COLLAPSIBLE KEYBOARD STRUCTURE FOR A NOTEBOOK COMPUTER, RESPONSIVE TO OPENING AND CLOSING OF THE COMPUTER'S LID".

BACKGROUND OF THE INVENTION

1. Field of the Invention

The present invention relates generally to computer apparatus, and more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

As can be readily seen from the foregoing, it would be desirable to provide an improved notebook computer keyboard structure which permits a useful thickness reduction in the closed computer without a corresponding reduction in the operative keystroke distance of the keyboard structure. It is accordingly an object of the present invention to provide such an improved notebook computer keyboard structure.

SUMMARY OF THE INVENTION

In carrying out principles of the present invention, in accordance with a preferred embodiment thereof, a portable computer, representatively a notebook computer, is provided with a specially designed collapsible keyboard structure. The computer includes a base housing portion having a top side, and a lid housing portion secured to the base housing portion for pivotal movement relative thereto between a closed position in which the lid housing portion extends across and covers the top side, and an open position in which the lid housing portion uncovers and exposes the top side of the base housing portion.

The collapsible keyboard structure, in a preferred embodiment thereof, includes a first support structure, representatively a keyboard monoblock structure, anchored to the base housing and extending across its top side. A series of keys are carried on the top side of the first support structure for vertical movement relative thereto, through a key stroke distance, between upwardly extended operative positions at the top of the key strokes and downwardly retracted nonoperative positions vertically separated from the extended positions by a distance greater than the key stroke distance. Accordingly, when the keys are in their retracted positions the overall vertical thickness of the keyboard structure is reduced by an amount greater than the key stroke distance. Preferably, the keys are secured to the first support structure by scissored linkage arm assemblies having central portions with mutually angled bearing and cam surfaces thereon.

A second support structure, representatively the upper dome sheet layer of a multilayered keypad structure, is carried within the base housing and has a top side facing the bottom side of the first support structure. A spaced series of resilient key return members, representatively elastomeric dome members, are anchored to the second support structure for movement therewith and have top end portions projecting upwardly beyond the top side of the second support structure.

The first and second support structures are horizontally and vertically shiftable relative to one another between a first position in which the key return members underlie and resiliently hold the keys in their extended positions and permit the keys to be resiliently moved downwardly from their extended positions through their key stroke distances, and a second position in which the key return members are horizontally and downwardly shifted in a manner permitting the keys to be moved from their extended positions to their retracted positions without vertically compressing the resilient key return members.

Due to the unique downward shifting of the key return members the overall keyboard structure thickness, when the keyboard structure is in its retracted storage and transport orientation, is advantageously reduced by more than the keystroke distance of the keys.

In the illustrated preferred embodiment of the collapsible keyboard the first support structure is anchored to the base housing, a horizontally oriented base plate member is anchored to the base housing and underlies the second support structure, and the second support structure is carried within the base housing for horizontal and vertical shifting movement relative to the first support structure and the base plate member. The collapsible keyboard structure further comprises cooperatively engageable means disposed on the key return members and the support plate member and operative to (1) shift the second support structure upwardly away from the support plate member in response to a horizontal shifting of the second support structure in a first direction relative to the support plate member, and (2) permit the second support structure to shift downwardly toward the support plate member in response to a horizontal shifting of the second support structure relative to the support plate member in a second direction opposite to the first direction.

The cooperatively engageable means preferably include a spaced plurality of openings formed in the base plate member and having interior side surface portions, and bottom end projections formed on the resilient key return members and extending downwardly beyond the second support structure. The bottom end projections are configured to be downwardly received in the base plate member openings when the second support structure is shifted in the second direction, and have sloped vertical side surfaces configured to engage the side surface portions of the openings, and cam the bottom end projections upwardly out of the openings and onto the top side of the support plate member, when the second support structure is shifted in the first direction.

Drive projections are preferably formed on the top side of the second support structure and are operative, in response to the shifting of the second support structure from its first position to its second position, to engage and move portions of the scissored linkage arm assemblies in a manner forcibly collapsing the assemblies to positively drive the keys from their upwardly extended operative positions to their downwardly retracted nonoperative positions.

Preferably, means are provided for automatically shifting the second support structure to its first position in response to opening the computer lid housing, and automatically shifting the second support structure to its second position in response to closing the lid housing.

DETAILED DESCRIPTION

Figure 1:
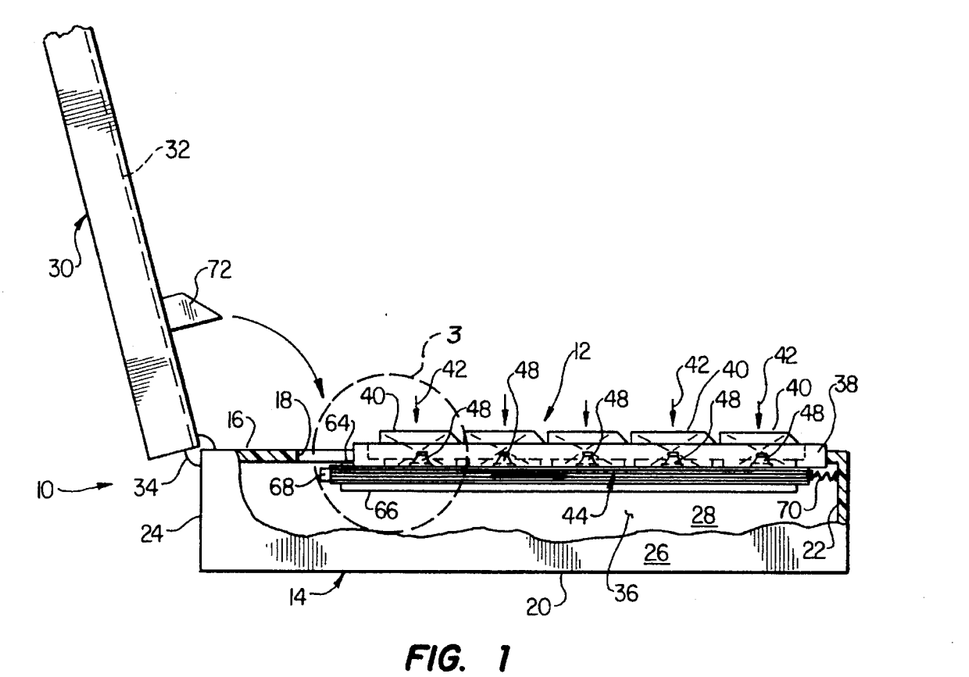
FIG. 1 is a partially sectioned, simplified side elevational view of a notebook computer having a collapsible keyboard structure embodying principles of the present invention, the computer being in an opened orientation and the keyboard structure being in its key-extended use configuration.
Figure 2:
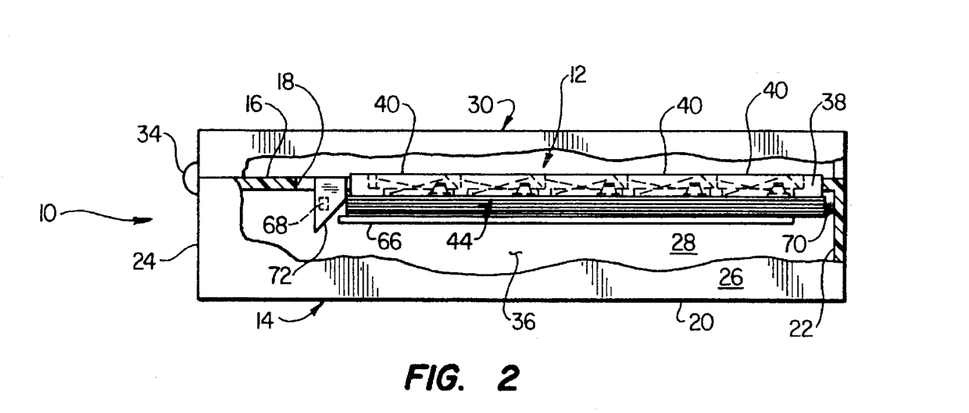
FIG. 2 is a view similar to that in FIG. 1, but with the computer in its closed orientation and the keyboard structure being in its key-retracted storage/transport orientation.

Referring initially to FIGS. 1 and 2, the present invention provides a portable computer, illustratively a notebook computer 10, having incorporated therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22, 24; and a pair of opposite vertical side walls 26, 28.

A hollow rectangular lid housing 30, having a display screen 32 on its front or inner side, is pivotally secured along a hinge joint 34 to a top rear corner portion of the base housing 14. Lid housing 30 may upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. Referring now to FIGS. 1, 2 and 4, the keyboard structure basically comprises a relatively thin rectangular monoblock support structure 38 that horizontally extends across the base housing top side opening 18 and is suitably anchored to the base housing 14; a series of manually depressible key cap members 40 carried for vertical movement relative to the support structure 38 (as indicated by the arrows 42 in FIG. 1) through a keystroke distance D (see FIG. 3A); and a rectangularly configured, multilayer signal pad structure 44 that underlies the support structure 38 and is transverse to the keystroke directions 42.

The signal pad structure 44, which is of a generally conventional construction, is shown in simplified exploded form in FIG. 4 and includes, from top to bottom, (1) a plastic dome sheet 46 having a spaced series of rubber key return domes 48 projecting upwardly from its top side; (2) a plastic top circuit sheet 50 having a spaced series of circular, electrically conductive pads 52 disposed on its bottom side, aligned with the domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62.

The five sheet members 46, 50, 54, 58, 62 are suitably held in their indicated stacked orientation to combinatively define the overall signal pad structure 44. As illustrated in FIGS. 1–3B, the signal pad structure 44 has opposite side edge portions that are slidably retained between two sets of horizontal rail member pairs 64, 66 formed on the interior sides of the base housing side walls 26 and 28. For purposes later described, the rail member pairs 64, 66 support the signal pad structure 44 for horizontal front-to-rear movement relative to the base housing 14, and thus relative to the keyboard support structure 38, between a first position (FIGS. 1 and 3A) in which the left or rear side edge of the signal pad structure 44 abuts a pair of stop projections 68 formed on the inner sides of the base housing side walls 26 and 28, and a second position (FIGS. 2 and 3B) in which the signal pad structure 44 is forwardly shifted away from the stop projections 68.

With the computer lid housing 30 in its FIG. 1 open position, a plurality of schematically depicted compression spring members 70, interposed between the right or front edge of the signal pad structure 44 and the front base housing end wall 22, resiliently hold the signal pad structure 44 in its first position. However, as the lid housing 30 is subsequently closed, a spaced pair of tapered cam projections 72 disposed on the front or inner side of the lid housing 30 engage the rear side edge of the signal pad structure 44 and drive it to its second position (FIG. 2) against the resilient resistance force of the spring members 70. When the lid housing 30 is opened again, the cam projections 72 are lifted out of engagement with the signal pad structure 44 to thereby permit the spring members 70 to drive the signal pad structure 44 back to its FIG. 1 first position.

According to an important aspect of the present invention, in a manner subsequently described herein this selective shifting of the signal pad structure 44 relative to the keyboard support structure 38 is operative to automatically shift the key cap members 40 between a FIG. 3A extended operating orientation (when the signal pad structure 44 is in its leftwardly shifted first position), and a FIG. 3B retracted position (when the signal pad structure 44 is in its rightwardly shifted second position).

Turning now to FIGS. 3A, 3B, 5A and 5B, each of the key cap members 40 has a hollow, rectangular molded plastic body with a top side wall 74 with a downwardly and forwardly sloping front edge portion 76, and an open bottom side 78. A scissored linkage assembly 80 is secured to the bottom of each of the key cap members 40 and includes a first pair of scissor arms 82 and a second pair of scissor arms 84, with longitudinally intermediate portions of the arms 82 being pivotally connected to longitudinally intermediate portions of the arms 84 as indicated.

First ends of the arms 82 are joined by a cylindrical rod 86 pivotally anchored in tabs 88 projecting downwardly from the top key member wall 74, while the opposite ends of the arms 82 have outwardly projecting cylindrical pins 90 formed thereon and slidingly received in a slot 92 formed in the bottom side of the support structure 38. First ends of the arms 84 are joined by a cylindrical rod 94 having its opposite ends pivotally anchored in tabs 96 on the bottom side of the support structure 38, while the opposite ends of the arms 84 have outwardly projecting cylindrical pins 98 slidingly received in slots 100 formed on the underside of the key cap member 40.

Longitudinally intermediate portions of the scissor arms 84 are interconnected by a joining plate structure 102 having, on its underside, a bottom bearing surface 104, and a forwardly facing cam surface 106 extending at an angle to the bearing surface 104. The scissored linkage assembly 80 is movable relative to its associated key cap member 40 between an extended position shown in FIGS. 3A and 5A, and a retracted position shown in FIGS. 3B and 5B.

Figure 3A:
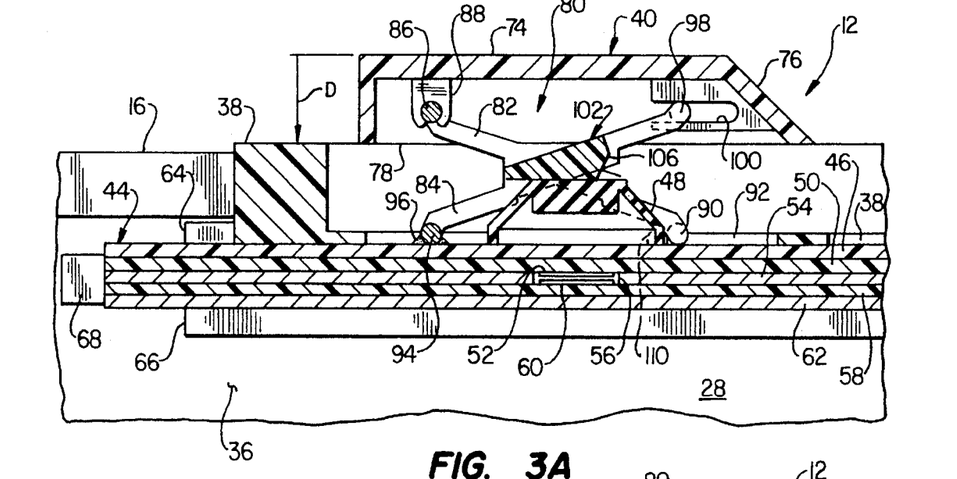
FIGS. 3A and 3B are enlarged scale cross-sectional detail views of the circled area "3" in FIG. 1 with the keyboard key cap members respectively in their extended use positions and their retracted storage/transport positions.
Figure 3B:
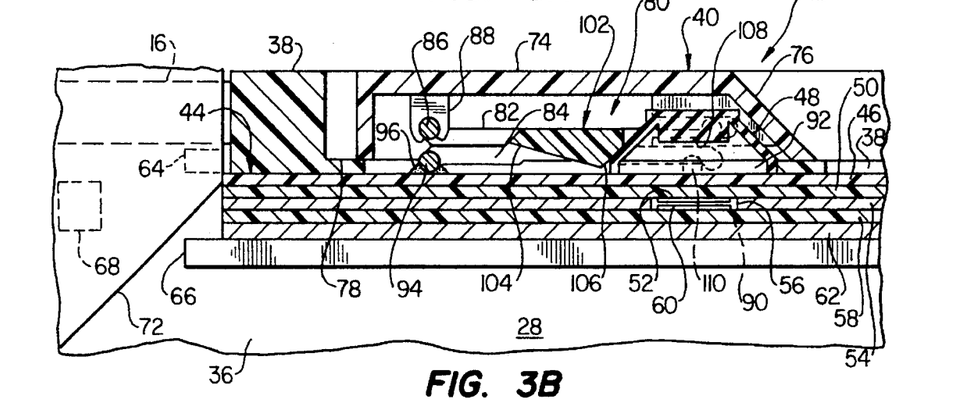
Figure 4:
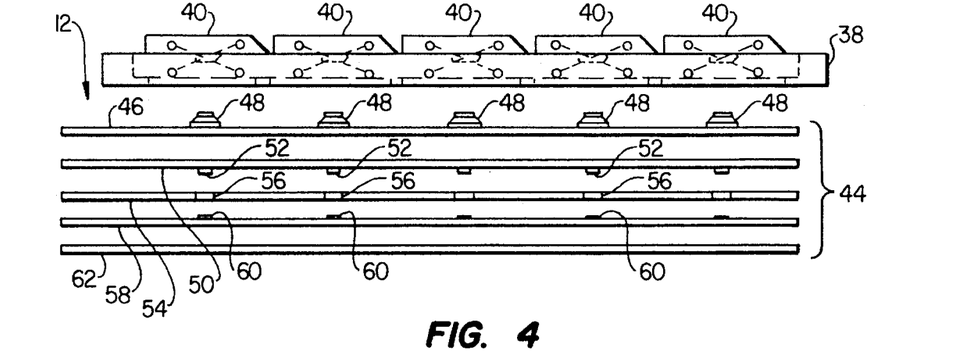
FIG. 4 is a highly schematic exploded side elevational view of the keyboard structure.
Figure 5A:
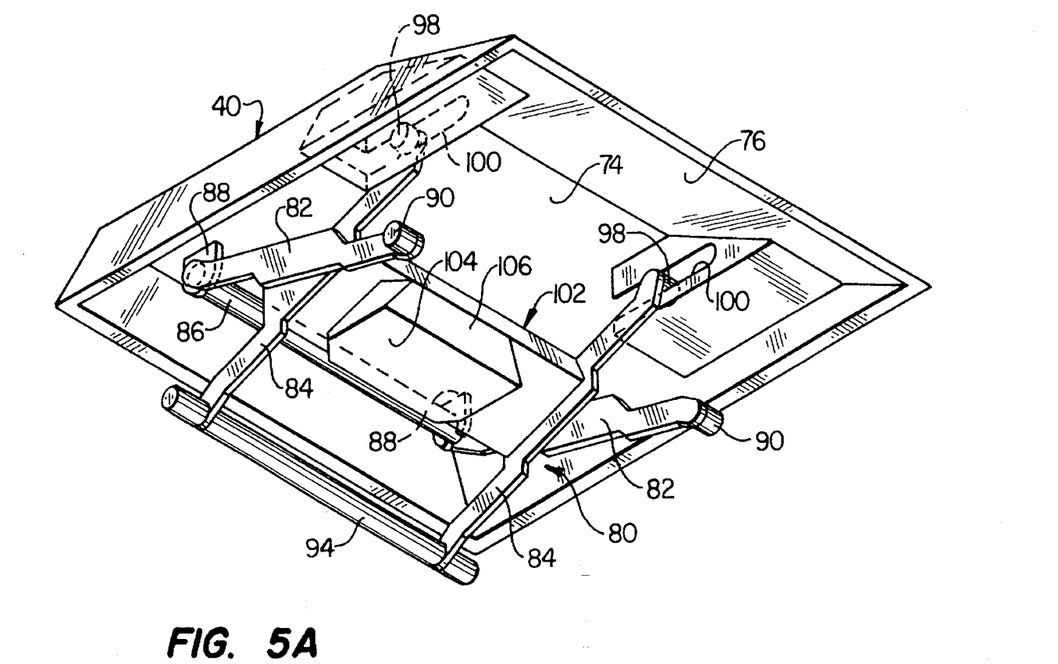
FIGS. 5A and 5B are enlarged scale bottom side perspective views of a key cap member respectively illustrating a scissored support portion thereof in its extended and retracted position.
Figure 5B:
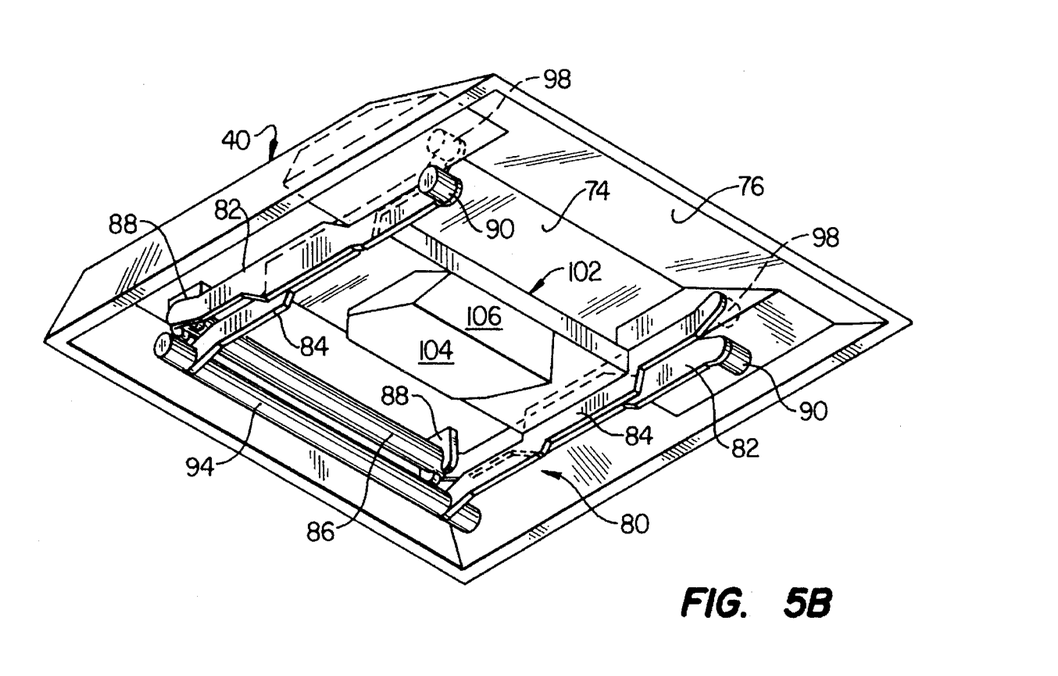

Referring now to FIGS. 3A and 3B, with the lid housing 30 opened, the signal pad structure 44 is driven to its FIG. 3A position (by the spring members 70 shown in FIG. 1, and the key cap members 40 are in their FIG. 3 operatively extended positions in which the scissored linkage assemblies 80 are in their extended positions, with the bearing surfaces 104 of the linkage assemblies 80 overlying and downwardly engaging the upper ends of the resilient key return domes 48.

When any of the key cap members 40 is manually depressed, against the resilient resistance of its associated return dome 48, the dome is downwardly deformed to cause an internal projection 108 therein to be downwardly pressed against a portion of the dome sheet 46 underlying the projection 108. This, in turn, causes the contact Dad pair 52,60 underlying the projection 108 to be brought into engagement with one another and cause their associated circuitry to output an electrical signal indicative of the striking of their associated key cap member. When the key cap member is released from its manually depressed orientation, it is automatically returned upwardly to its FIG. 3A position by the resilient force of its underlying key return dome 48 which functions as a return spring means.

When the signal pad structure 44 is forwardly shifted from its FIG. 3A position to its FIG. 3B position, in response to closing the lid housing 30 as previously described, the key return domes 48 are forwardly moved out from under their associated scissor linkage bearing surfaces 104, and the scissored linkage assemblies 80 are forcibly driven to their retracted FIG. 3B positions. This, in turn, downwardly drives the key cap members 40 to their FIG. 3B retracted positions, thereby reducing the overall thickness of the collapsible keyboard structure 12 by the keystroke distance D.

The forcible retraction of the key cap members 40 is effected by a spaced series of upward projections 110 formed on the top side of the dome sheet 46. Pairs of the projections 110 are positioned on opposite sides of the domes 48 and located immediately behind the opposite ends of the scissor arm pins 90. When the signal pad structure 44 is rightwardly driven away from its FIG. 3A position the projections 110 rightwardly engage and drive the pins 90 to thereby forcibly move the scissored linkage assemblies 80 from their FIG. 3A extended positions to their retracted FIG. 3B positions. Alternatively, the projections 110 could be omitted and the key cap members 40 permitted to fall by gravity to their retracted FIG. 3B positions when the signal pad structure 44 is rightwardly driven from its FIG. 3A position to its FIG. 3B position.

When the lid housing 30 is opened again, the resulting leftward or rearward driven movement of the signal pad structure 44 causes the sloping rear side surfaces of the key return domes 48 to rearwardly engage the forwardly and upwardly sloped cam surfaces 106 of the linkage assemblies 80 in a manner forcing the linkage assemblies 80 back to their FIG. 3A extended positions in which the upper ends of the domes 48 underlie and engage the linkage assembly bearing surfaces 104 to thereby return the key cap members 40 to their upwardly extended operative positions.

From the foregoing it can be seen that the collapsible keyboard structure 12 of the present invention effectively reduces the thickness of the keyboard structure in its FIG. 3B storage/transport orientation by the key stroke distance D, and automatically brings the keyboard structure to this orientation in response to the closure of the lid housing 30. Accordingly, the key stroke distance D does not have to be undesirably reduced (compared to the corresponding key stroke distance of a desktop computer keyboard) to reduce the storage/transport thickness of the keyboard structure 12.

While the keyboard structure 12 has been representatively depicted as having the keyboard support structure 38 fixedly secured to the base housing 14, with the signal pad structure 44 being shiftable relative to the support structure 38, it will be appreciated that, alternatively, the keyboard support structure 38 could be shifted relative to the signal pad structure 44 if desired.

Additionally, while the key structures 40 have been representatively illustrated as being supported on the keyboard carrying structure 38 using scissored linkage assemblies, other means of supporting the key cap members 40 for vertical movement could be utilized if desired. Moreover, spring return means other than the rubber key return domes 48 could be provided for forward and rearward shifting relative to the key cap members if desired.

Figure 6A:
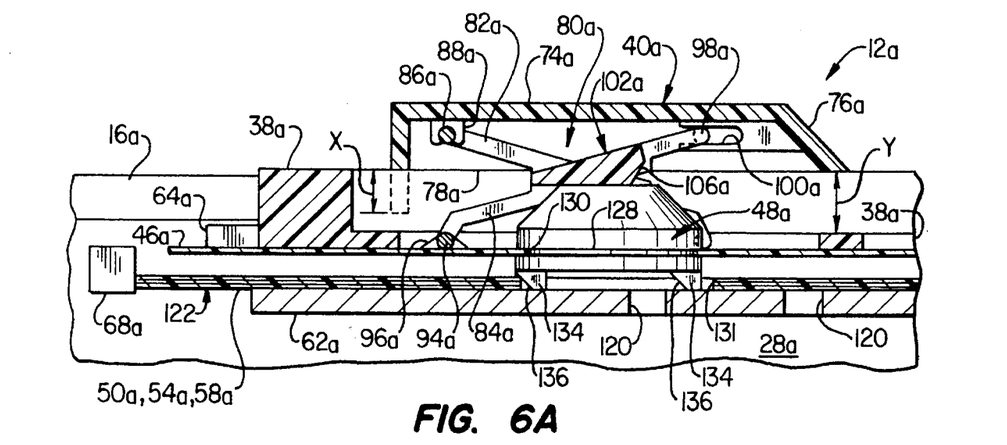
FIGS. 6A and 6B are cross-sectional detail views, partly in elevation, that are respectively similar to FIGS. 3A and 3B and illustrate portions of an alternate embodiment of the collapsible keyboard structure.
Figure 6B:
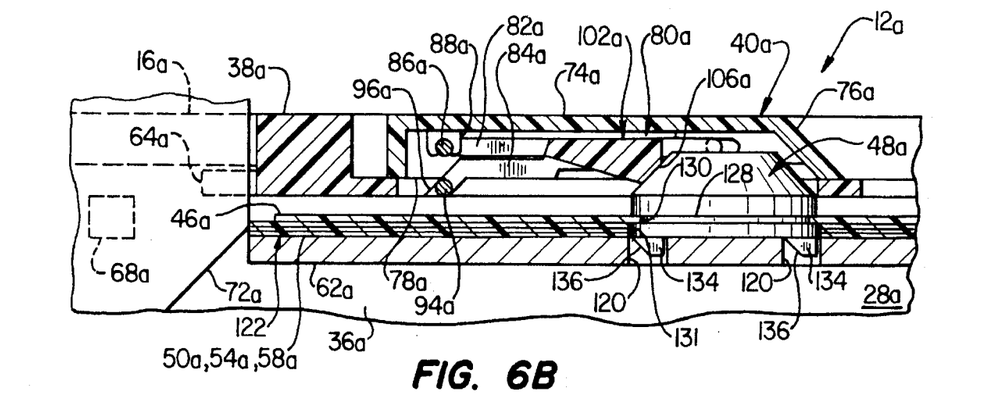

Illustrated in FIGS. 6A and 6B in somewhat simplified cross-sectional form is an alternate embodiment 12a of the previously described collapsible keyboard structure 12. To facilitate comparison of the two collapsible keyboard structures 12 and 12a, the components in the keyboard 12a similar to those in keyboard 12 have been given identical reference numerals with the subscripts "a". FIG. 6A illustrates the collapsible keyboard structure 12a with its key cap members 40a in their upwardly extended operating positions (with the lid housing 30 opened), while FIG. 6B illustrates the key cap members 40a in their downwardly retracted positions (with the lid housing 30 closed).

A primary difference between the collapsible keyboard structures 12 and 12a is that the vertical distance Y between the extended and retracted positions of the key caps 40a is greater than the key stroke distance X of the key caps 40a (which, in turn, is representatively equal to the key stroke distance D of the key cap members 40 shown in FIG. 3A). This advantageously permits the overall vertical thickness of the keyboard structure 12a in its retracted storage/transport orientation to be even further reduced compared to that of the previously described collapsible keyboard structure 12.

Only relatively minor modifications have to be made to the previously described keyboard structure 12 to achieve this vertical height reduction in the collapsed keyboard structure 12a. For example, with continuing reference to FIGS. 6A and 6B, in accordance with a primary inventive aspect of the collapsible keyboard structure 12a, in response to closure of the lid housing 30 the resilient key return domes 48a are shifted horizontally (as in the case of the previously described collapsible keyboard 12) and downwardly to permit the additional downward retraction of the key caps 40a from their FIG. 6A upwardly extended positions to their FIG. 6B downwardly retracted positions.

To facilitate this horizontal and vertical shifting of the key return domes 48a, the lower support rail 66 (see FIGS. 3A and 3B) is eliminated and the metal backing sheet 62a is suitably anchored in place within the base housing 14. The metal backing sheet or base plate 62a forms a support structure that replaces the rail 66 and has a spaced series of holes 120 formed therein. The balance of the previously described signal pad structure 44 includes the dome sheet 46a and a bottom portion 122 separate from the dome sheet 46a and defined, from top to bottom, by the intersecured top circuit sheet 50a, spacer sheet 54a and bottom circuit sheet 58a.

The bottom signal pad structure portion 122 slidably rests atop the stationary base plate 62a for horizontal movement relative thereto, and the dome sheet 46a is interposed between the underside of the monoblock support structure 38 and the top side of the signal pad structure portion 122 and is vertically shiftable between a FIG. 6A position in which the dome sheet 46a engages the underside of the monoblock structure 38a and a FIG. 6B position in which the dome sheet 46a engages the top side of the signal pad structure portion 122.

Figure 7:
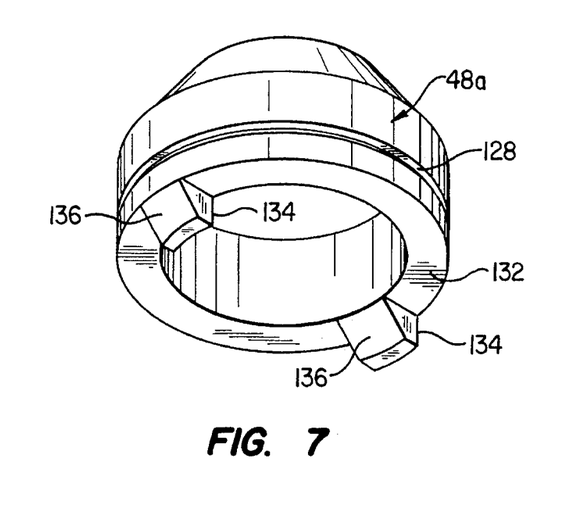
FIG. 7 is an enlarged scale bottom end perspective view of a specially designed resilient key return dome member incorporated in the collapsible keyboard embodiment shown in FIGS. 6A and 6B.

The scissored linkage assembly 80a is substantially identical in construction and operation to its counterpart linkage shown in FIGS. 3A and 3B, but the key cad members 40a have reduced vertical heights to accommodate their increased downward travel Y from their FIG. 6A extended positions to their FIG. 6B downwardly retracted positions. With reference now to FIG. 6A–7, each elastomeric key return dome 48a has an annular exterior side surface groove 128 that receives an annular section of the dome sheet 46a surrounding circular holes 130 formed in the dome sheet, thereby anchoring the domes 48a on the dome sheet 46a for horizontal and vertical movement therewith.

Projecting downwardly from the annular bottom side 132 of each dome 48a are a diametrically opposite pair of foot members 134 having tapered side surfaces 136. With the keyboard structure in its FIG. 6A operating position the foot members 132 of each dome 48a are positioned within one of the openings 131 and slidably rest upon the top side surface of the base plate 62a to thereby hold the dome sheet 46a against the underside of the monoblock structure 38a. With the keyboard structure in its FIG. 6B collapsed orientation the foot members 134 of each dome 48a are downwardly received in an aligned pair of the signal pad holes 120, thereby downwardly positioning the dome sheet 46a against the top side of the signal Dad structure portion 122.

With the lid housing 30 opened (FIG. 6A) the compression spring members 70 (see FIG. 1) drive the signal pad portion 122 leftwardly into engagement with the stop projections 68a, thereby causing the key return domes 48a, via the scissored linkages 80a, to drive the key caps 40a to their upwardly extended positions. Because the dome sheet 46a is linked to the bottom signal pad portion 122 via the domes 48a, this also leftwardly drives the dome sheet 46a to its FIG. 6A position.

When the lid housing 30 is subsequently closed, the cam projections 72a, against the resilient resistance force of the springs 70, rightwardly drive the signal pad portion 122 away (and thus the dome sheet 46a) from its FIG. 6A first position thereby, via the interaction between the domes 48a and the linkages 80a, downwardly forcing the key caps 40a toward their FIG. 6B retracted positions. As the dome feet 134 slide rightwardly along the top side of the base plate 62a into alignment with its holes 120 the feet 134 are pushed downwardly into the holes 120 to downwardly bring the dome sheet 46a to its FIG. 6B position and downwardly move the domes 48a (without deforming them) to permit the key caps 40a to complete their retraction through the distance Y—a distance somewhat greater than their operative key stroke distance X.

When the lid housing 30 is subsequently opened, the springs 70 (see FIG. 1) drive the signal pad portion 122 leftwardly away from its FIG. 6B second position. In response to this leftwardly driven movement of the signal pad portion 122 the tapered dome feet side surfaces 134 slide against interior side surface portions of the base plate openings 120 to thereby cam the domes 48a (and thus the dome sheet 46a) upwardly until the feet 134 upwardly clear the base plate holes 120 and slide leftwardly along the top side surface of the base plate 62a until the dome sheet 46a upwardly reaches its FIG. 6A position. The leftward and upward movement of the domes 48a operatively engages the scissored linkages 80a in a manner upwardly driving the key cap members 40a to their FIG. 6A upwardly extended positions in which the key return domes 48a operatively underlie their associated key cap members 40a.

The foregoing detailed description is to be clearly understood as being given by way of illustration and example only, the spirit and scope of the present invention being limited solely by the appended claims.

What is claimed is:

1. A collapsible keyboard structure for a portable computer, comprising:

a first support structure having top and bottom sides;

a series of keys each carried on said top side of said first support structure for vertical movement relative thereto, through a vertical key stroke distance, between extended and retracted positions separated by a vertical distance greater than said key stroke vertical distance;

a second support structure carried beneath said first support structure and having a top side facing said bottom side of said first support structure; and a spaced series of resilient key return members anchored to said second support structure and having top end portions projecting upwardly beyond said top side of said second support structure, said first and second support structures being horizontally and vertically shiftable relative to one another between a first position in which said key return members underlie and resiliently hold said keys in said extended positions thereof and permit said keys to be resiliently moved downwardly from said extended position through said key stroke distance, and a second position in which said key return members are horizontally and downwardly shifted in a manner permitting said keys to be moved from said extended positions thereof to said retracted positions thereof without vertically compressing said resilient key return members.

2. The collapsible keyboard structure of claim 1 further comprising:

cooperatively engageable means on said keys and said second support structure for forcibly driving said keys from said extended positions thereof to said retracted positions thereof in response to shifting of said first and second support structures from said first position thereof to said second position thereof.

3. The collapsible keyboard structure of claim 2 wherein:

said keys are secured to said first support structure by scissored linkage arm assemblies, and said cooperatively engageable means include portions of said scissored linkage arm assemblies and a spaced series of projections formed on said top side of said second support structure and operative to drivingly engage and move said portions of said scissored linkage arm assemblies, in response to a relative shifting of said first and second support structures from said first position thereof to said second position thereof, in a manner forcibly collapsing said scissored linkage arm assemblies.

4. The collapsible keyboard structure of claim 1 wherein:

said keys are secured to said key support structure by scissored linkage arm assemblies each having a central portion with mutually angled bearing and cam surfaces thereon, said resilient key return members are hollow elastomeric dome members having upper ends and sloping side portions adjacent thereto, said upper ends of said dome members underlying and upwardly engaging said bearing surfaces when said first and second support structures are in said first position thereof, and said cam surfaces being positioned and configured to be slidingly engaged by said sloping dome member side portions in a manner driving said key members from said retracted positions thereof to said extended positions thereof in response to a relative shifting of said first and second support structures from said second position thereof to said first position thereof.

5. The collapsible keyboard structure of claim 1 wherein:

said first support structure is a generally rectangular monoblock support structure.

6. The collapsible keyboard structure of claim 1 wherein:

said second support structure comprises a multilayered signal pad structure with closable electrical contact structures underlying said resilient key return members.

7. The collapsible keyboard structure of claim 1 wherein:

said collapsible keyboard structure further comprises a horizontally oriented support plate member disposed beneath said second support structure in a fixed relationship with said first support structure, said second support structure is horizontally and vertically shiftable relative to said first support structure and said support plate member, and said collapsible keyboard structure further comprises cooperatively engageable means disposed on said key return members and said support plate member and operative to (1) shift said second support structure upwardly away from said support plate member in response to a horizontal shifting of said second support structure in a first direction relative to said support plate member, and (2) permit said second support structure to shift downwardly toward said support plate member in response to a horizontal shifting of said second support structure relative to said support plate member in a second direction opposite to said first direction.

8. The collapsible keyboard structure of claim 7 wherein said cooperatively engageable means include:

a spaced plurality of openings formed in said base plate member and having interior side surface portions, and bottom end projections formed on said resilient key return members and extending downwardly beyond said second support structure, said bottom end projections being configured to be downwardly received in said base plate member openings when said second support structure is shifted in said second direction, and having sloped vertical side surfaces configured to engage said side surface portions of said openings, and cam said bottom end projections upwardly out of said openings and onto the top side of said support plate member, when said second support structure is shifted in said first direction.

9. A portable computer comprising:

a base housing portion having a top side:

a lid housing portion secured to said base housing portion for pivotal movement relative thereto between a closed position in which said lid housing portion extends across and covers said top side, and an open position in which said lid housing portion uncovers and exposes said top side; and a collapsible keyboard structure including:

a first support structure extending across said top side of said base housing portion and having top and bottom sides, a series of keys each carried on said top side of said first support structure for vertical movement relative thereto, through a vertical key stroke distance, between extended and retracted positions separated by a vertical distance greater than said key stroke vertical distance, a second support structure carried beneath said first support structure and having a top side facing said bottom side of said first support structure, and a spaced series of resilient key return members anchored to said second support structure and having top end portions projecting upwardly beyond said top side of said second support structure, said first and second support structures being horizontally and vertically shiftable relative to one another between a first position in which said key return members underlie and resiliently hold said keys in said extended positions thereof and permit said keys to be resiliently moved downwardly from said extended position through said key stroke distance, and a second position in which said key return members are horizontally and downwardly shifted in a manner permitting said keys to be moved from said extended positions thereof to said retracted positions thereof without vertically compressing said resilient key return members.

10. The portable computer of claim 9 wherein:

said portable computer is a notebook computer.

11. The portable computer of claim 9 wherein:

said first support structure is anchored to said base housing portion, and said second support structure is horizontally shiftable relative to said first support structure.

12. The portable computer of claim 9 further comprising:

first shifting means, responsive to opening said lid housing portion, for shifting said one of said first and second support structures from said second position thereof to said first position thereof, and second shifting means, responsive to closing said lid housing portion, for shifting said one of said first and second support structures from said first position thereof to said second position thereof.

13. The portable computer of claim 12 wherein:

said first shifting means include spring means for resiliently biasing said one of said first and second support structures toward said first position thereof, and said second shifting means include cam means carried by said lid housing portion and operative, in response to closure of said lid housing portion, to engage said one of said first and second support structures and drive it from said first position thereof to said second position thereof.

14. The portable computer of claim 13 wherein:

said resilient key return members are elastomeric key return dome members.

15. The collapsible keyboard structure of claim 9 further comprising:

cooperatively engageable means on said keys and said second support structure for forcibly driving said keys from said extended positions thereof to said retracted positions thereof in response to shifting of said first and second support structures from said first position thereof to said second position thereof.

16. The portable computer of claim 15 wherein:

said keys are secured to said first support structure by scissored linkage arm assemblies, and said cooperatively engageable means include portions of said scissored linkage arm assemblies and a spaced series of projections formed on said top side of said second support structure and operative to drivingly engage and move said portions of said scissored linkage arm assemblies, in response to a relative shifting of said first and second support structures from said first position thereof to said second position thereof, in a manner forcibly collapsing said scissored linkage arm assemblies.

17. The portable computer of claim 9 wherein:

said keys are secured to said key support structure by scissored linkage arm assemblies each having a central portion with mutually angled bearing and cam surfaces thereon, said resilient key return members are hollow elastomeric dome members having upper ends and sloping side portions adjacent thereto, said upper ends of said dome members underlying and upwardly engaging said bearing surfaces when said first and second support structures are in said first position thereof, and said cam surfaces being positioned and configured to be slidingly engaged by said sloping dome member side portions in a manner driving said key members from said retracted positions thereof to said extended positions thereof in response to a relative shifting of said first and second support structures from said second position thereof to said first position thereof.

18. The portable computer of claim 9 wherein:

said first support structure is a generally rectangular monoblock support structure.

19. The portable computer of claim 9 wherein:

said collapsible keyboard structure further comprises a horizontally oriented support plate member disposed beneath said second support structure in a fixed relationship with said first support structure, said second support structure is horizontally and vertically shiftable relative to said first support structure and said support plate member, and said collapsilble keyboard structure further comprises cooperatively engageable means disposed on said key return members and said support plate member and operative to (1) shift said second support structure upwardly away from said support plate member in response to a horizontal shifting of said second support structure in a first direction relative to said support plate member, and (2) permit said second support structure to shift downwardly toward said support plate member in response to a horizontal shifting of said second support structure relative to said support plate member in a second direction opposite to said first direction.

20. The portable computer of claim 19 wherein said cooperatively engageable means include:

a spaced plurality of openings formed in said base plate member and having interior side surface portions, and bottom end projections formed on said resilient key return members and extending downwardly beyond said second support structure, said bottom end projections being configured to be downwardly received in said base plate member openings when said second support structure is shifted in said second direction, and having sloped vertical side surfaces configured to engage said side surface portions of said openings, and cam said bottom end projections upwardly out of said openings and onto the top side of said support plate member, when said second support structure is shifted in said first direction.

* * * * *